(12) United States Patent
Wagle et al.

(10) Patent No.: US 11,118,094 B2
(45) Date of Patent: Sep. 14, 2021

(54) COMPOSITIONS AND METHODS OF USE OF WATER-BASED DRILLING FLUIDS WITH INCREASED THERMAL STABILITY

(71) Applicant: Saudi Arabian Oil Company, Dhahran (SA)

(72) Inventors: Vikrant Wagle, Abqaiq (SA); Abdullah Al-Yami, Dhahran (SA); Hussain Al-Bahrani, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/669,680

(22) Filed: Aug. 4, 2017

(65) Prior Publication Data
US 2018/0223155 A1    Aug. 9, 2018

Related U.S. Application Data

(60) Provisional application No. 62/454,518, filed on Feb. 3, 2017.

(51) Int. Cl.
*C09K 8/04* (2006.01)
*C09K 8/06* (2006.01)
*E21B 21/00* (2006.01)

(52) U.S. Cl.
CPC .................. *C09K 8/06* (2013.01); *C09K 8/04* (2013.01); *E21B 21/003* (2013.01); *C09K 2208/32* (2013.01)

(58) Field of Classification Search
CPC . C09K 8/36; C09K 8/32; C09K 8/035; C09K 8/032; C09K 8/40; C09K 8/06; C09K 8/04; C09K 8/12; C09K 8/52; C09K 8/82; C09K 8/48; C09K 8/64; C09K 8/08; C09K 8/34; C09K 8/524; C09K 8/588; C09K 8/601; C09K 8/24; C09K 8/72; C09K 8/46; C09K 8/565; C09K 8/602; C09K 8/605; C09K 8/80; C09K 8/42; C09K 8/54; C09K 8/74; C09K 8/18; C09K 8/203; C09K 8/206; C09K 8/512; C09K 8/68; C09K 8/725; C09K 8/805; C09K 8/03; C09K 8/14; C09K 8/145; C09K 8/16; C09K 8/44; C09K 8/504; C09K 8/516; C09K 8/62; C09K 8/665; C09K 8/88; C09K 8/882; C09K 2208/32; E21B 21/003
See application file for complete search history.

(56) References Cited

U.S. PATENT DOCUMENTS

| | | | |
|---|---|---|---|
| 4,508,628 A * | 4/1985 | Walker | C09K 8/36 507/129 |
| 4,900,457 A | 2/1990 | Clarke-Sturman et al. | |
| 5,306,340 A | 4/1994 | Donche et al. | |
| 7,143,827 B2 | 12/2006 | King et al. | |
| 7,618,924 B2 | 11/2009 | Al-Yami et al. | |
| 7,732,379 B2 | 6/2010 | Hussain et al. | |
| 9,273,242 B2 | 3/2016 | Al-Yami et al. | |
| 2003/0017953 A1 | 1/2003 | Horton et al. | |
| 2005/0124502 A1 * | 6/2005 | Shaarpour | C09K 8/16 507/204 |
| 2006/0234873 A1 | 10/2006 | Ballard | |
| 2009/0042749 A1 | 2/2009 | Meier et al. | |
| 2009/0186781 A1 * | 7/2009 | Zhang | C09K 8/032 507/140 |
| 2009/0192052 A1 * | 7/2009 | Zhang | C09K 8/032 507/140 |
| 2010/0137168 A1 | 6/2010 | Quintero et al. | |
| 2010/0216671 A1 | 8/2010 | Jones et al. | |
| 2012/0015852 A1 | 1/2012 | Quintero et al. | |
| 2013/0130945 A1 | 5/2013 | Miller et al. | |
| 2013/0133886 A1 | 5/2013 | Quintero et al. | |
| 2013/0210686 A1 * | 8/2013 | Augsburger | C09K 8/52 507/244 |
| 2014/0024560 A1 | 1/2014 | Gonzalez Poche et al. | |
| 2014/0209387 A1 | 7/2014 | Jamison et al. | |
| 2014/0209392 A1 | 7/2014 | Jamison et al. | |
| 2015/0087563 A1 | 3/2015 | Brege et al. | |
| 2016/0122614 A1 | 5/2016 | McDaniel et al. | |
| 2016/0145484 A1 | 5/2016 | Shumway et al. | |
| 2017/0362486 A1 * | 12/2017 | Santos | C09K 8/08 |

FOREIGN PATENT DOCUMENTS

| | | | |
|---|---|---|---|
| CN | 1772759 A | | 5/2006 |
| EP | 2821457 | * | 1/2015 |
| EP | 2821457 A1 | | 7/2015 |
| SU | 1004442 | * | 3/1983 |
| WO | 2009/090371 A1 | | 7/2009 |
| WO | WO2009/090371 | * | 7/2009 |
| WO | 2016187362 A1 | | 11/2016 |

OTHER PUBLICATIONS

Product data sheet Micomax downloaded on Aug. 5, 2020.*
EBS 425—Mineral Perinstrain downloaded on Aug. 5, 2020.*
Al-Abdullatif, et al., "Development of New Kill Fluids with Minimum Sagging Problems for High Pressure Jilh Formation in Saudi Arabia", Saudi Aramco Journal of Technology, Spring 2015.
The International Search Report and Written Opinion for related PCT application PCT/US2017/045519 dated Oct. 30, 2017.

* cited by examiner

*Primary Examiner* — Kumar R Bhushan
(74) *Attorney, Agent, or Firm* — Bracewell LLP; Constance G. Rhebergen; Brian H. Tompkins

(57) ABSTRACT

Provided here are water-based drilling fluids containing weighting agents and an alkanolamine, and methods of using such compositions during drilling operations for recovery of hydrocarbons. The weighting agents can include manganese tetroxide and barium sulfate. The alkanolamine can be monoethanolamine. Various other embodiments may be disclosed and claimed.

6 Claims, No Drawings

COMPOSITIONS AND METHODS OF USE OF WATER-BASED DRILLING FLUIDS WITH INCREASED THERMAL STABILITY

CROSS-REFERENCE TO RELATED APPLICATIONS

This application claims priority to and benefit of U.S. Provisional Patent Application No. 62/454,518 titled "Compositions and Methods of Use of Water-Based Drilling Fluids with Increased Thermal Stability" filed on Feb. 3, 2017, the entire contents of which is incorporated herein by reference.

TECHNICAL FIELD

The disclosure relates to fluid compositions used for drilling and well treatment activities in hydrocarbon recovery.

BACKGROUND

Issues associated with stuck pipe result in huge losses in the world oil industry, and in some cases, can account for nearly half of total well cost. Stuck pipe is a significant risk in high-angle and horizontal wells. Historically, horizontal wells drilled in Saudi Arabia have been known to present severe stuck-pipe challenges. Stuck pipe issues are categorized into two main types—differential pipe sticking and mechanical pipe sticking. Mechanical sticking is caused by physical obstruction in the wellbore, such as high accumulation of cuttings in the annulus, or borehole instability issues from hole caving, sloughing, and plastic squeezing, or when cement and other materials are dropped into the drill bore. The pipe sticking by differential mechanism is caused by the differential pressure forces from an overbalanced mud column acting on the drilling mechanism against the filter cake deposited on a permeable formation. The difference between hydrostatic and formation pressure is managed by controlling the thickness of the mud cake and optimizing the drilling fluid density. The thermal stability of many fluids used in the treatment of subterranean formations and recovery of hydrocarbons, such as completion fluids, work-over fluids and drilling fluids, is another major problem. Temperatures in subsurface formations generally increase approximately 25 to 30 degrees Celsius (° C.) per kilometer (15 degrees Fahrenheit (° F.) per 1000 feet). Many components in the fluids undergo chemical degradation with undesirable reduction of viscosity, thus imposing limitations upon their use below a corresponding depth. Choice of drilling fluid formulations, their rheological properties, their behavior under drilling conditions, types of additives, and other parameters have to be carefully evaluated to prevent or at least minimize these issues.

SUMMARY

Water-based drilling fluids disclosed and described here contain specific weighting agents and a thermal stabilizer to address the shortcomings of the art. An embodiment includes a drilling fluid composition containing an aqueous base containing manganese tetroxide and barium sulfate functioning as weighting agents and an alkanolamine. The drilling fluids can also contain one or more of a corrosion inhibitor, a rheology modifier, a defoamer, and their derivatives. The barium sulfate can be present in the form of barite. The ratio of manganese tetroxide to the barium sulfate present in the drilling fluid composition can range from about 5:95 to 95:5. The ratio of barium sulfate to manganese tetroxide present in the drilling fluid composition can be 3:2. The drilling fluid composition can contain monoethanolamine as the alkanolamine. The drilling fluid composition is formulated such that it has stable rheological properties at a temperature ranging between about 100° F. to about 450° F. In certain embodiments, the number of carbon atoms in the alkanolamines present in the drilling fluid can range from 2 to 6 carbon atoms. In certain embodiments, the number of carbon atoms in the alkanolamines present in the drilling fluid can range from 2 to 5 carbon atoms. In some embodiments, the alkanolamine present in the drilling fluid is a non-cationic ethanolamine compound.

Embodiments also include methods of increasing thermal stability of the fluid, the method comprising addition of an alkanolamine to a drilling fluid composition that contains manganese tetroxide and barium sulfate as weighting agents. Embodiments also include methods of treating a wellbore with a drilling fluid during hydrocarbon recovery. One such method includes the steps of introducing into a wellbore a drilling fluid, containing an aqueous base with manganese tetroxide and barium sulfate functioning as weighting agents; and an alkanolamine; and circulating the drilling fluid through the subterranean formation during drilling. This drilling fluid used in this method further contains one or more of a corrosion inhibitor, a rheology modifier, a defoamer, and their derivatives. The barium sulfate in the drilling fluid used in this method can be present in the form of barite. The ratio of manganese tetroxide to the barium sulfate present in the drilling fluid used in this method can range from about 5:95 to 95:5. The ratio of barium sulfate to manganese tetroxide present in the drilling fluid composition can be 3:2. In certain embodiments, the number of carbon atoms in the alkanolamine present in the drilling fluid can range from 2 to 6 carbon atoms. In certain embodiments, the number of carbon atoms in the alkanolamines present in the drilling fluid can range from 2 to 5 carbon atoms. In some embodiments, the alkanolamines present in the drilling fluid is a non-cationic ethanolamine compound. The drilling fluid used in this method can contain monoethanolamine as the alkanolamine. The drilling fluid used in this method is formulated such that it has stable rheological properties at a temperature ranging between about 100° F. to about 450° F.

Embodiments also include methods of maintaining thermal stability of a drilling fluid during hydrocarbon recovery from a subterranean formation. One such method includes the steps of providing, a drilling fluid containing an aqueous base with manganese tetroxide, barium sulfate, and an alkanolamine; and performing a drilling operation in the subterranean formation with the drilling fluid; wherein the drilling fluid continues to have stable rheological properties at a temperature greater than 250° F. The drilling fluid used in this method is formulated to have stable rheological properties at a temperature ranging between about 100° F. to about 450° F. The drilling fluid used in this method is formulated to result in less high temperature high pressure fluid loss as compared to an identical drilling fluid composition without the alkanolamine.

DETAILED DESCRIPTION

Disclosed here are various formulations of water-based drilling fluids containing barite and manganese tetroxide as weighting agents. Certain embodiments include formulations of these water based drilling fluids in the presence of a thermal stabilizer to achieve the optimum rheological and filtration properties. In certain embodiments, the thermal stabilizer used in the drilling fluid contains an alkanolamine. In certain embodiments, the alkanolamine used as a thermal stabilizer is monoethanolamine. Embodiments described here also facilitate the control of fluid loss in fluids injected under pressure into subterranean formations. These embodiments include drilling fluid compositions containing barite, manganese tetroxide, and an alkanolamine. Methods for employing such improved drilling fluids during drilling of wellbores are also described here. Further embodiments may be described and disclosed.

The term "subterranean formation" includes both a rock containing hydrocarbons, in particular oil, and the various rock layers traversed in order to access this oil-bearing rock and to ensure the extraction of the hydrocarbons. The term "rock" is used to denote any type of material of a solid subterranean formation, whether or not the material constituting it is strictly speaking a rock.

In the following description, numerous details are set forth in order to provide a thorough understanding of the various embodiments. In other instances, well-known processes, devices, and systems may not been described in particular detail in order not to unnecessarily obscure the various embodiments. Other embodiments may be utilized, and changes may be made without departing from the scope of this disclosure.

The description may use the phrases "in various embodiments," "in an embodiment," or "in embodiments," which may each refer to one or more of the same or different embodiments. Furthermore, the terms "comprising," "including," "having," "containing," and the like, as used with respect to embodiments of the present disclosure, are synonymous.

To mitigate the problems arising from stuck-pipe issues, drilling fluid formulations have been developed that contain a combination of two different weighting agents. Weighting agents are compounds that are added to drilling fluids to increase the density. These agents are used to control formation pressures and to help combat the effects of sloughing or heaving shales that may be encountered in stressed areas. Commonly used weighting materials include galena, hematite, magnetite, lilmenite, iron oxide, barite, siderite, celesite, dolomite, and calcite. Embodiments of the drilling fluids disclosed here contain barite ($BaSO_4$) and manganese tetroxide ($Mn_3O_4$) as the two weighting agents. The amount of weighting agent to be added will depend on the mud weight required. Higher the mud weight, higher is the amount of weighting agents required to achieve it. Fluid mud weight depends on the formation properties. The use of such combinations as weighting agents in a drilling fluid provides both operational and monetary benefits. $BaSO_4$, which has a specific gravity of 4.2 and a particle size with a $D_{50}$ value of 20 is the most widely used weighting material in drilling fluid due to its proven economics and ability to provide high density. $D_{50}$ is the diameter, when all particles in a sample are arranged in order of ascending mass, at which fifty percent of a sample's mass is comprised of smaller particles. Disadvantages of using $BaSO_4$ alone arise from its low hardness and the tendency of $BaSO_4$ particles to settle, especially after an extended period of time. The low hardness causes the $BaSO_4$ component to create fine particles upon extensive shearing, resulting in high gel strength values, formation damage, and a rise in equivalent circulating density. $Mn_3O_4$ has a specific gravity of 4.95 and a particle size with a $D_{50}$ value of 1 These features reduce solids loading and settling as compared to $BaSO_4$. So, when a drilling fluid includes $Mn_3O_4$ as another weighting agent, the density of the drilling fluid increases. $Mn_3O_4$'s acid solubility also helps reduce the risk of formation damage. In certain embodiments, the ratio of barite and manganese tetroxide in the drilling fluid ranges from 1:19 to 19:1 by volume. Increasing the amounts of manganese tetroxide beyond certain limits leads to an adverse effect on the high temperature and high pressure (HTHP) fluid loss. Increasing the amounts of barite beyond certain limits leads to an adverse effect on the rheology of the fluid. The amount of barite and manganese tetroxide can be adjusted to get to desired rheology and filtration control properties for a particular drilling fluid. In certain embodiments, the drilling fluid contains 60/40% v/v of barite to manganese tetroxide to provide the desired rheology and filtration control properties. In certain embodiments, the drilling fluid contain barite and manganese tetroxide in the ratio of 3:2 by volume.

Developing the right combination of components in a drilling fluid with the right fluid rheology is difficult, because excessive heat, dehydration and solids loading can deteriorate mud properties. The addition of weighting materials, such as $BaSO_4$ or $Mn_3O_4$, is needed to achieve the desired density to overbalance the well and avoid any possible flow from the formation; however, maintaining a high volume of solids content of $BaSO_4$ particles or any other material in suspension is challenging, especially for extended periods of time. The separation of weighting material particles from the drilling fluid compositions leads to undesirable density fluctuation as the drilling fluid is being circulated throughout the hole. This phenomenon, often referred as barite sag, may lead to serious well control incidents, stuck pipe, lost circulation and nonproductive time. However, at high temperatures and pressures, the viscosifiers, and fluid loss control agents used in the drilling fluid degrade, thus resulting in a loss of filtration and rheological properties. Thus, a need was recognized to develop a formulation, which would sustain high temperature and pressures encountered while drilling.

Several of the components of the fluids described here undergo chemical and physical degradation due to the geothermal gradient. This degradation results in changes in density and viscosity and other undesirable changes in properties, thus posing challenges in their use in drilling operations below a corresponding depth. Embodiments of the drilling fluid formulations include water-based drilling fluids that are stable at high temperatures with good rheology and filtration properties. These embodiments would reduce the stuck pipe problems and thus result in less nonproductive time. Embodiments include drilling fluid compositions that are formulated to have stable rheological properties at temperatures ranging between about 100° F. to about 450° F. These drilling fluid compositions can be formulated to have stable rheological properties at temperatures ranging between about 100° F. to about 350° F. These drilling fluid compositions can be formulated to have stable rheological properties at temperatures ranging between about 200° F. to about 450° F.

Embodiments include water-based drilling fluids comprising a combination of barite and manganese tetroxide as weighting agents and hot rolled at high temperatures. These drilling fluids are formulated in the presence of a thermal stabilizer to maintain the rheological and filtration properties after hot rolling at high temperature. In certain embodiments, the thermal stabilizer used in the drilling fluid is an alkanolamine. In certain embodiments, the alkanolamine used as a thermal stabilizer is monoethanolamine. In other embodiments, secondary amines, such as methylethanolamine or tertiary amines such as diethylethanolamine, dimethylethanolamine, methyldiethanolamine, or combinations of such amines can also be employed as thermal stabilizers. In certain embodiments, the number of carbon atoms in the alkanolamines present in the drilling fluid can range from 2 to 6 carbon atoms. In certain embodiments, the number of carbon atoms in the alkanolamines present in the drilling fluid can range from 2 to 5 carbon atoms. Drilling fluids disclosed here are substantially free of alkanolamine surfactants that have a long chain hydrophobic group, namely having more than a six-carbon chain. Such surfactants have limited solubility in water, and thus, would not be suitable as thermal stabilizers in the compositions described here.

Embodiments include water-based drilling fluids containing a combination of barite, manganese tetroxide, an alkanolamine, and other components to provide desirable density, viscosity, filtration control, rheology control, pH-control, surface activity modification, lubrication, flocculation, and protection from toxic or corrosive agents. The drilling fluids can contain clays, natural or synthetic polymers, an inert solid, a fluid loss-control agent, a salt, a dispersant, a corrosion inhibitor, a viscosifier, or a defoamer. Examples of inert solids or certain chemically inactive solids present in the suspension include, without limitations, limestone, dolomite sands, salts or loading materials such as barite. Examples of fluid loss-control agents used in these embodiments include, without limitations, starches, modified starches, polysaccharides, modified polysaccharides, synthetic polymers, such as sulfonated co and ter-polymers, polyacrylates, polyacrylamides, and lignites. Examples of polysaccharides include cells lose derivatives, such as carboxyethylcellulose, carboxymethylcellose, carbosymethylhydroxyethylcellulose, alkylhydroxyalkylcelluloses, alkylcelluloses, alkylcarboxyalkylcelluloses and hydroxyalkylcelluloses (particular hydroxyethylcellulose), and microbial polysaccharides such as Succinoglycan polysaccharides, Scleroglucane polysaccharides and Xanthan polysaccharides. Examples of viscosifiers used to reduce viscosity and gel strength in these embodiments include, without limitations, lignosulfonates, polyphosphates, polyacrylates of low molecular weight, sulfonated polymers, phosphonic polymers, acrylic comb polymers, and other synthetic polymers. Examples of corrosion inhibitors used in these embodiments include, without limitations, chemical scavengers of oxygen, carbon dioxide, or hydrogen sulfide. A variety of surfactants serve as emulsifiers, foamers and defoamers, wetting agents and lubricants.

The drilling fluid formulations can also include salts such as halide salts (e.g. chlorides and bromides) of mono- or divalent cations. Examples of salts used include and are not limited to calcium chloride ($CaCl_2$), calcium bromide ($CaBr_2$), potassium chloride (KCl), sodium chloride (NaCl), and other appropriate salts and combinations of such salts. In an embodiment, the drilling fluid has a water phase salinity concentration of approximately 250 thousand parts per million. In various embodiments, the fluid can be formulated to have a water phase salinity concentration of approximately 100 to 390 thousand parts per million. In various embodiments, the fluid can be formulated to have approximately 0.25 pounds per barrel (lbm/bbl) of lime. In various embodiments, the fluid can be formulated to have approximately 0.1 to 5 lbm/bbl of lime. For example, Table 1 shows the various components of a thermally stable drilling fluid formulation containing barite, manganese tetroxide, and an alkanolamine. The combination of barite and manganese tetroxide is not compatible with drilling fluids. For example, when drilling fluids contain zinc bromide and calcium bromide-based brines as the base, addition of 60/40% v/v barite and manganese tetroxide combination of weighting agents can produce an unstable fluid formulation resulting in sag of weighting agents in the fluid.

The fluid compositions disclosed here are further defined by these properties—plastic viscosity (PV), yield point (YP), and low shear yield point (LSYP). The YP and PV are parameters from the Bingham-Plastic rheological model. The PV of a drilling fluid represents the viscosity of a drilling fluid when extrapolated to infinite shear rate and is calculated as the difference between the viscometer readings at the 600 rpm and the 300 rpm settings, expressed in units of centipoise (cP). Fluids with low PV can function in rapid drilling circumstances because, among other properties, such fluids have low viscosity upon exiting the drill bit and has an increased flow rate. A high PV may be caused by a viscous base fluid, excess colloidal solids, or both. Yield Point (YP) is defined as the value obtained from the Bingham-Plastic rheological model when the yield stress is extrapolated to a shear rate of zero. YP is calculated by subtracting PV from the viscometer readings at the 300 rpm setting. The YP is expressed in the units of $lb/100\ ft^2$. YP is used to evaluate a drilling fluid's ability to lift small pieces of rock dislodged by the drill bit out of the annulus (the wellbore and casing or between casing and tubing, where the drilling fluid flows). Fluids with high YP can carry cuttings better than a fluid of similar density but lower YP. A YP greater than 15 $lb/100\ ft^2$ is considered good for drilling. In other embodiments, a drilling fluid can be formulated to have a YP in the range of 10 $lb/100\ ft^2$ to 45 $lb/100\ ft^2$.

Regarding yield stress, a value for yield stress may be indicated by the parameter TO (Tau zero), which is the stress that must be applied to a material to make it begin to flow (or yield) and is a parameter from the Herschel Buckley rheology model. Generally, a drilling fluid with a yield stress value that is relatively high may be expected to provide a better sag resistance, which is desirable for drilling purposes. The parameter to may be determined by fitting the HB model to a shear stress versus shear rate curve, which may be the dial readings plotted against the corresponding rpm determined on a standard oilfield viscometer. $\tau_0$ may be expressed in similar units as YP. $\tau_0$ may be estimated within reasonable engineering tolerances by calculating a low shear yield point (LSYP) value. An LSYP value equal to or greater than approximately 7 $lbf/100\ ft^2$ may be considered an acceptable threshold value for drilling purposes for minimizing barite sag.

Certain embodiments include methods for drilling a wellbore through a formation using thermally stable drilling fluids according to formulations disclosed here. In certain embodiments, the method includes operating a drilling assembly to drill a wellbore and circulating a drilling fluid composition through the wellbore as it is drilled, where the drilling fluid is water-based drilling fluid containing a combination of barite, manganese tetroxide, and an alkanolamine. Embodiments also include methods of maintaining thermal stability of a drilling fluid during hydrocarbon recovery from a subterranean formation. One such method includes the steps of providing, a drilling fluid containing an aqueous base with manganese tetroxide, barium sulfate, and an alkanolamine; and performing a drilling operation in the subterranean formation with the drilling fluid; wherein the drilling fluid continues to have stable rheological properties at a temperature greater than 250° F. The drilling fluid used in this method is formulated to have stable rheological properties at a temperature ranging between about 100° F. to about 450° F. The drilling fluid used in this method is formulated to result in less high temperature high pressure fluid loss as compared to an identical drilling fluid composition without the alkanolamine. In certain embodiments, the high temperature high pressure fluid loss can be between ten to fifty percent less when using a drilling fluid containing an alkanolamine as compared to the loss when using an identical drilling fluid composition without the alkanolamine. In certain embodiments, the high temperature high pressure fluid loss can be between ten to forty percent less when using a drilling fluid containing an alkanolamine as compared to the loss when using an identical drilling fluid composition without the alkanolamine. In certain embodiments, the high temperature high pressure fluid loss can be between twenty to thirty percent less when using a drilling fluid containing an alkanolamine as compared to the loss when using an identical drilling fluid composition without the alkanolamine.

The following specific and non-limiting examples are to be construed as merely illustrative, and do not limit the present disclosure in any way whatsoever. Without further undue experimentation, one skilled in the art can, based on the description here and the examples, utilize the present disclosure to its fullest extent.

Examples

The following is an example of a water-based drilling fluid containing a combination of barite, manganese tetroxide, and an alkanolamine. The ingredients can be added at a stated concentration of weight by volume of the drilling fluid, for example, in units of pounds per barrel of the drilling fluid. As shown in Table 1, this formulation was developed by mixing approximately 3 lbm/bbl of bentonite with 262.37 lbm/bbl of water for about five minutes, followed by the addition of 1 lbm/bbl of xanthan gum biopolymer (XC polymer) and mixing for another five minutes. XC polymer is a high molecular weight polysaccharide that is used as a viscosifier due to its shear thinning properties and good suspension characteristics even in the absence of inorganic colloids. Then, about 4 lbm/bbl of low viscosity polyanionic cellulose (PAC LV) was added to the mixture and mixed for about five minutes, followed by the addition of 3 lbm/bbl of HOSTADRILL® additive and mixing for another five minutes. The PAC LV does not affect the drilling fluid viscosity and provides filtration control in water-based drilling fluids. The HOSTADRILL® additive (available from Clariant AG, headquartered in Muttenz, Switzerland) works under high temperature and high salinity to provide fluid loss control in water-based drilling fluids. Then, about 58 lbm/bbl of sodium chloride and 0.5 lbm/bbl of sodium hydroxide were added sequentially and each step was followed by mixing for five minutes each. Two ground and sized calcium carbonate components—about 5 lbm/bbl of $CaCO_3$ 50 and about 5 lbm/bbl of $CaCO_3$ 25—and 0.25 lbm/bbl of lime were added sequentially and each step was followed by mixing for five minutes each. Lime increases the carrying capacity of water-based drilling fluids by flocculating the bentonite and drilled solids. The two weighting agents—about 121.1 lbm/bbl of barite and about 95.1 lbm/bbl of manganese tetroxide—and 0.35 lbm/bbl of sodium sulfite were added sequentially and each step was followed by mixing for five minutes each. The ratio of barite and manganese tetroxide in the drilling fluid is 60/40% v/v. Then, only for fluid formulation II, 2 lbm/bbl of monoethanolamine was added and mixed for five minutes. The two drilling fluids, Formulations I and II have a fluid density of 100 pounds per cubic foot (pcf).

TABLE 1

| Formulation no. | I | II |
|---|---|---|
| Water, ppb | 262.37 | 262.37 |
| Bentonite, ppb | 3.00 | 3.00 |
| XC polymer, ppb | 1.00 | 1.00 |
| PAC LV, ppb | 4.00 | 4.00 |
| HostaDrill ® additive, ppb | 3.00 | 3.00 |
| NaCl, ppb | 58.00 | 58.00 |
| NaOH, ppb | 0.50 | 0.50 |
| $CaCO_3$ 50, ppb | 5.00 | 5.00 |
| $CaCO_3$ 25, ppb | 5.00 | 5.00 |
| Lime, ppb | 0.25 | 0.25 |
| Barite, ppb | 121.1 | 121.1 |
| $Mn_3O_4$, ppb | 95.1 | 95.1 |
| Sodium Sulfite, ppb | 0.35 | 0.35 |
| Monoethanolamine, ppb | — | 2.00 |

The effects of temperature and pressure on a drilling fluid as the fluid circulates through the well bore were analyzed by subjecting the drilling fluid formulations I and II to the American Petroleum Institute (API) Recommended Practice 13B-1, Recommended Practice for Field Testing Water-Based Drilling Fluids. Both drilling fluid formulations were hot-rolled in a roller oven at 270° F. for 16 hours to simulate the downhole conditions during drilling. Table 2 shows the performance of monoethanolamine in obtaining good rheological and filtration properties of water-based drilling fluids formulated with barite and manganese tetroxide as weighting agents and hot rolled at 270° F. for 16 hours.

TABLE 2

| Test condition | Formulation I Reading (cP) | Formulation II Reading (cP) |
|---|---|---|
| 600 | 110 | 115 |
| 300 | 70 | 78 |
| 200 | 55 | 62 |
| 100 | 36 | 44 |
| 6 | 8 | 11 |
| 3 | 6 | 9 |

Formulation I, formulated in the absence of monoethanolamine, had a YP and LSYP of 30 lbf/100 ft$^2$ and 4 lbf/100 ft$^2$ respectively. HTHP fluid loss measured at 270° F. for Formulation I was 16 ml. Formulation II formulated in the presence of 2 ppb Monoethanolamine has a YP and LSYP of 41 lbf/100 ft$^2$ and 7 lbf/100 ft$^2$ respectively. HTHP fluid loss for Formulation II was 12 ml, which is about a 25% decrease in the amount of fluid loss. This shows that the presence of monoethanolamine in Formulation II helps to impart higher rheology and good filtration properties as compared to Fluid 1, which was formulated in the absence of monoethanolamine.

TABLE 3

| Calculated property | Formulation I Value | Formulation II Value |
|---|---|---|
| PV (cP) | 40 | 37 |
| YP (lbf/100 ft$^2$) | 30 | 41 |
| LSYP(lbf/100 ft$^2$) | 4 | 7 |
| 10 sec gel strength, lb/100 ft$^2$ | 6 | 9 |
| 10 min gel strength, lb/100 ft$^2$ | 9 | 20 |
| HTHP fluid loss, ml, @270 F., 30 min | 16 | 12 |

Higher rheological properties of the fluid with alkanolamine implies that the polymers such as XC polymer and PAC LV are more thermally stable at higher temperatures due to the presence of alkanolamine. As these additives are more thermally stable, they give better rheology as compared to the fluid formulated without alkanolamine.

Ranges may be expressed here as from about one particular value and to about another particular value. Where the range of values is described or referenced here, the interval encompasses each intervening value between the upper limit and the lower limit as well as the upper limit and the lower limit and includes smaller ranges of the interval subject to any specific exclusion provided. A recited range (e.g., mass or weight percentages or carbon groups) includes each specific value, integer, decimal, or identity within the range. Any listed range can be easily recognized as sufficiently describing and enabling the same range being broken down into at least equal halves, thirds, quarters, fifths, or tenths as appropriate. As will also be understood by one skilled in the art, all language such as "at least", "greater than", "less than", "more than", "or more", and the like, include the number recited and such terms refer to ranges that can be subsequently broken down into sub-ranges as discussed above. In the same manner, all ratios recited here also include all sub-ratios falling within the broader ratio. Accordingly, specific values recited for radicals, substituents, and ranges, are for illustration only; they do not exclude other defined values or other values within defined ranges for radicals and substituents.

Where a method comprising two or more defined steps is recited or referenced here, the defined steps can be carried out in any order or simultaneously except where the context excludes that possibility.

While various embodiments have been described in detail for the purpose of illustration, they are not to be construed as limiting, but are intended to cover all the changes and modifications within the spirit and scope of the disclosure.

What is claimed is:

1. A water-based drilling fluid composition comprising:
    water;
    bentonite;
    a weighting agent comprising manganese tetroxide and barium sulfate, wherein the ratio of barium sulfate to manganese tetroxide present in the water-based drilling fluid composition is about 3:2 by volume;
    sodium sulfite;
    polyanionic cellulose;
    XC polymer; and
    a thermal stabilizer comprising an alkanolamine, wherein the alkanolamine has a concentration of at least 2 pounds per barrel (ppb) in the water-based drilling fluid composition,
    wherein the thermal stabilizer allows the water-based drilling fluid composition to have stable rheological properties at a temperature ranging between about 100° F. and about 450° F.,
    wherein the water-based drilling fluid composition has a high temperature high pressure fluid loss ten to fifty percent less than an identical drilling fluid composition without the alkanolamine,
    wherein the water-based drilling fluid composition has a yield point of at least 41 lbf/100 ft$^2$ and a low shear yield point of at least 7 lbf/100 ft$^2$.

2. The water-based drilling fluid composition of claim 1, wherein the water-based drilling fluid composition further contains one or more of a corrosion inhibitor, a rheology modifier, a defoamer, and their derivatives.

3. The water-based drilling fluid composition of claim 1, wherein the barium sulfate is present in the form of barite.

4. The water-based drilling fluid composition of claim 1, wherein number of carbon atoms in the alkanolamine ranges from 2 to 5 carbon atoms.

5. The water-based drilling fluid composition of claim 1, wherein the alkanolamine is a non-cationic ethanolamine compound.

6. The water-based drilling fluid composition of claim 1, wherein the water-based drilling fluid composition has stable rheological properties at a temperature greater than about 250° F.

* * * * *